United States Patent
Alobaidi et al.

(10) Patent No.: US 9,509,154 B2
(45) Date of Patent: Nov. 29, 2016

(54) ALGORITHMIC BATTERY CHARGING SYSTEM AND METHOD

(71) Applicant: Green Cubes Technology Corporation, Kokomo, IN (US)

(72) Inventors: Mohammed Alobaidi, New Albany, IN (US); Yan Leong Tan, Selayang (MY); Anthony Cooper, Kokomo, IN (US)

(73) Assignee: Green Cubes Technology Corporation, New Albany, IN (US)

( * ) Notice: Subject to any disclaimer, the term of this patent is extended or adjusted under 35 U.S.C. 154(b) by 254 days.

(21) Appl. No.: 13/951,262

(22) Filed: Jul. 25, 2013

(65) Prior Publication Data

US 2015/0028813 A1    Jan. 29, 2015

(51) Int. Cl.
| | |
|---|---|
| F23K 3/14 | (2006.01) |
| F23K 3/18 | (2006.01) |
| H01S 4/00 | (2006.01) |
| B23P 19/00 | (2006.01) |
| H02J 7/00 | (2006.01) |

(52) U.S. Cl.
CPC ............ *H02J 7/0042* (2013.01); *H02J 7/0004* (2013.01); *H02J 7/0006* (2013.01); *H02J 7/0045* (2013.01); *Y10T 29/49002* (2015.01)

(58) Field of Classification Search
CPC .... H02J 7/0003; H02J 7/0042; H02J 7/0045; H02J 7/0044; H01G 7/023; Y02E 60/12; B41J 2/395; B82Y 10/00; G02F 1/1339; H01M 10/46; H01M 2/1055; H01M 10/425; H01M 2/1022; H01R 13/6675; B81C 99/002; B23P 19/04; B23P 19/001; G11B 25/043; H05K 13/0417
USPC ................. 320/106, 110–115; 29/592.1, 729
See application file for complete search history.

(56) References Cited

U.S. PATENT DOCUMENTS

| | | | | |
|---|---|---|---|---|
| 4,843,299 | A * | 6/1989 | Hutchings ..................... | 320/125 |
| 5,420,493 | A * | 5/1995 | Hargadon et al. ............ | 320/106 |
| 5,780,991 | A * | 7/1998 | Brake et al. .................. | 320/112 |
| 6,252,373 | B1 * | 6/2001 | Stefansson ............ | H02J 7/0093 320/106 |
| 7,002,265 | B2 | 2/2006 | Potega | |
| 7,525,280 | B2 | 4/2009 | Fagan et al. | |
| 7,528,574 | B1 | 5/2009 | Adkins et al. | |
| 8,593,105 | B2 * | 11/2013 | Baarman et al. ............. | 320/108 |
| 8,670,799 | B2 * | 3/2014 | Pattenden ................ | G06F 1/26 320/106 |
| 8,768,549 | B2 * | 7/2014 | Erko ..................... | B60W 10/26 320/135 |
| 2001/0045813 | A1 | 11/2001 | Suzuki et al. | |
| 2004/0257043 | A1 | 12/2004 | Takaoka et al. | |
| 2011/0025277 | A1 | 2/2011 | Hussain et al. | |
| 2011/0121790 | A1* | 5/2011 | Brandon, II .......... | H02J 7/0003 320/160 |
| 2011/0187324 | A1* | 8/2011 | Tan ....................... | H02J 7/0045 320/111 |
| 2013/0002192 | A1* | 1/2013 | Fischbach ................ | H02J 7/00 320/107 |
| 2013/0030593 | A1 | 1/2013 | Gao et al. | |

OTHER PUBLICATIONS

Texas Instruments, "DV2000S1 and DV2000TS1—Multi-Chemistry Switching Charger Development System", Jun. 1999, Revised Oct. 2000, 5 pages.

\* cited by examiner

*Primary Examiner* — Richard Isla Rodas
*Assistant Examiner* — Mohammed J Sharief
(74) *Attorney, Agent, or Firm* — Alleman Hall McCoy Russell & Tuttle LLP (57) ABSTRACT

Methods and systems are provided for a battery charging system. The methods and systems allow a user to charge a plurality of different battery types and configurations via a single battery charger.

16 Claims, 7 Drawing Sheets

ALGORITHMIC BATTERY CHARGING SYSTEM AND METHOD

BACKGROUND AND SUMMARY

Manufactures of certain devices that use batteries such as personal computers, note pads, and cell phones may have access to a wide range of battery charger controller designs since different manufacturers utilize similar batteries in their products. For example, one laptop personal computer manufacture may use the same battery charger controller as is used by a second laptop personal computer manufacturer since the batteries of the different laptop personal computers have similar power requirements.

However, other manufacturers that provide medical and industrial devices may not be as fortunate as personal computer manufacturers because battery designs in these fields are often unique for each application. For example, a forklift manufacture may desire to charge a 36 volt lead-acid battery while a portable medical device manufacturer may desire to charge a 12 volt lithium-ion battery. Additionally, the manufacturers of medical and industrial devices may periodically request revised battery designs based on changes in their devices. For example, a manufacturer may request a higher voltage battery to increase torque output from a device. Alternatively, the manufacturer may request a different battery chemistry to alter battery charge capacity to increase device operating time. However, an off-the-shelf battery charger controller may not charge the unique battery in a way that is desirable. Consequently, the device manufacturer may have to purchase a custom battery charger controller for each new battery design or for each battery design revision. Therefore, the cost of implementing new battery designs or revisions for devices that have unique battery requirements may be greater than is desired.

The inventors herein have recognized the above-mentioned issue may be at least partly addressed by a method for manufacturing a battery charger, comprising: assembling a battery charging profile that includes a main block, a parallel block, and a series block; and manufacturing a battery charger that includes the battery charging profile.

By building a battery charging profile that includes a main block, a parallel block, and serial block, it may be possible to charge a plurality of different battery types using a single battery charger controller. Further, different serial blocks may be used in conjunction with different parallel blocks in a single battery charger controller to provide unique battery charging profiles for meeting a manufacturer's specific charging characteristics for a plurality of devices and/or battery designs. In this way, it may be possible for a device manufacturer to design a variety of different devices that use different batteries and charge the devices using a single battery charger controller that includes a plurality of unique charging profiles.

The present description may provide several advantages. Specifically, the approach may reduce development cost for battery operated devices. Additionally, the approach may be applied in different industries that apply different battery types and designs. Further, the approach may allow different users to share portions of different battery charging profiles to improve worker output.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
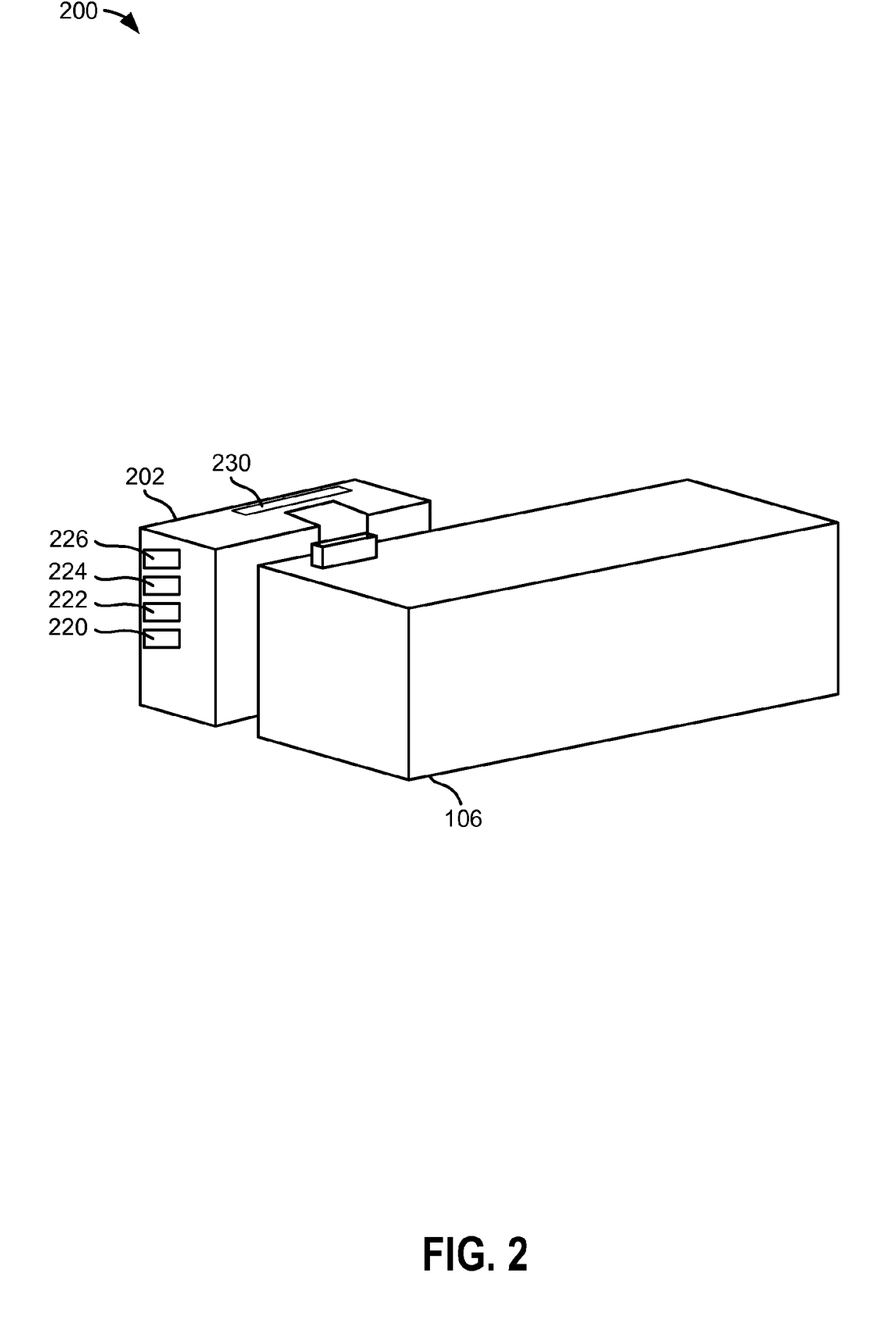
FIG. 2 shows an example high volume battery charging system.
Figure 3:
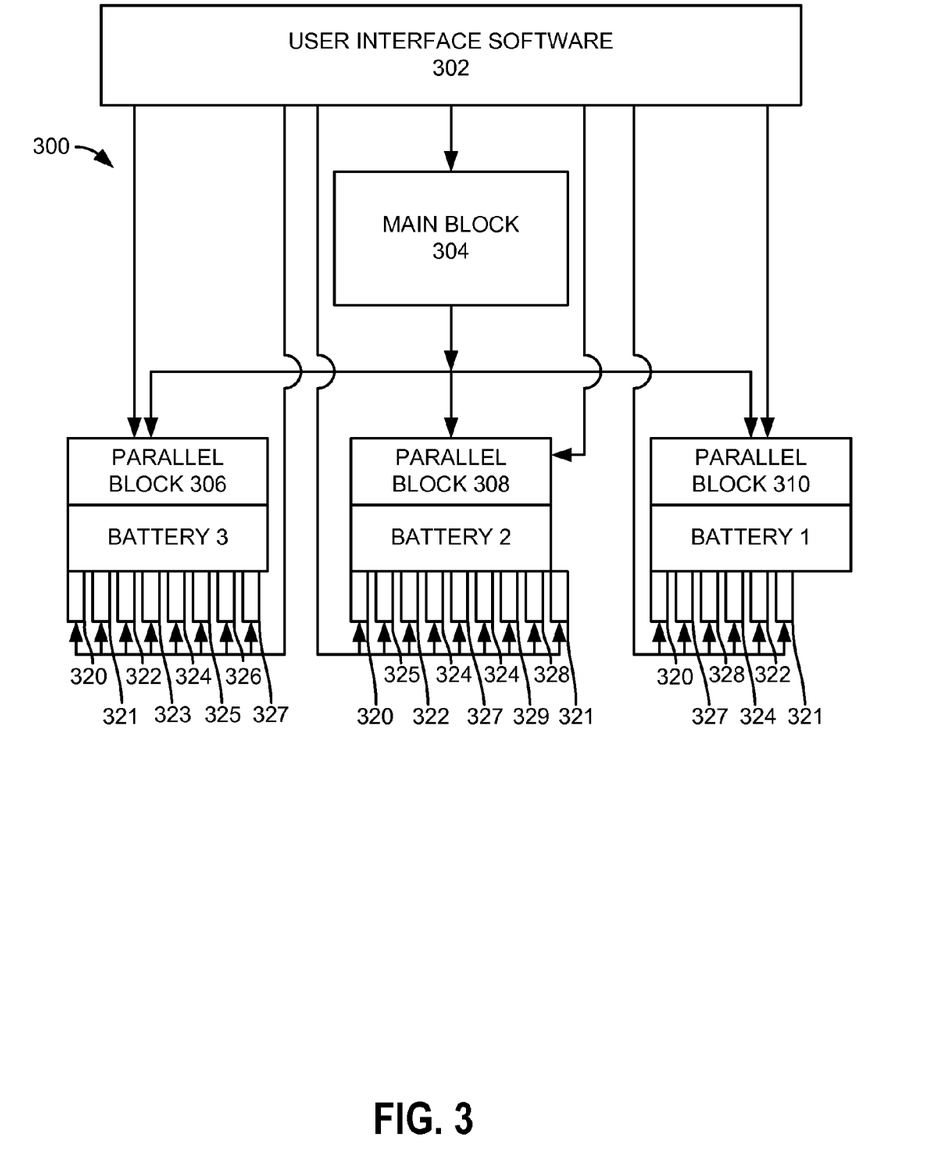
FIG. 3 shows a block diagram showing relationships between battery charger blocks.
Figure 5:
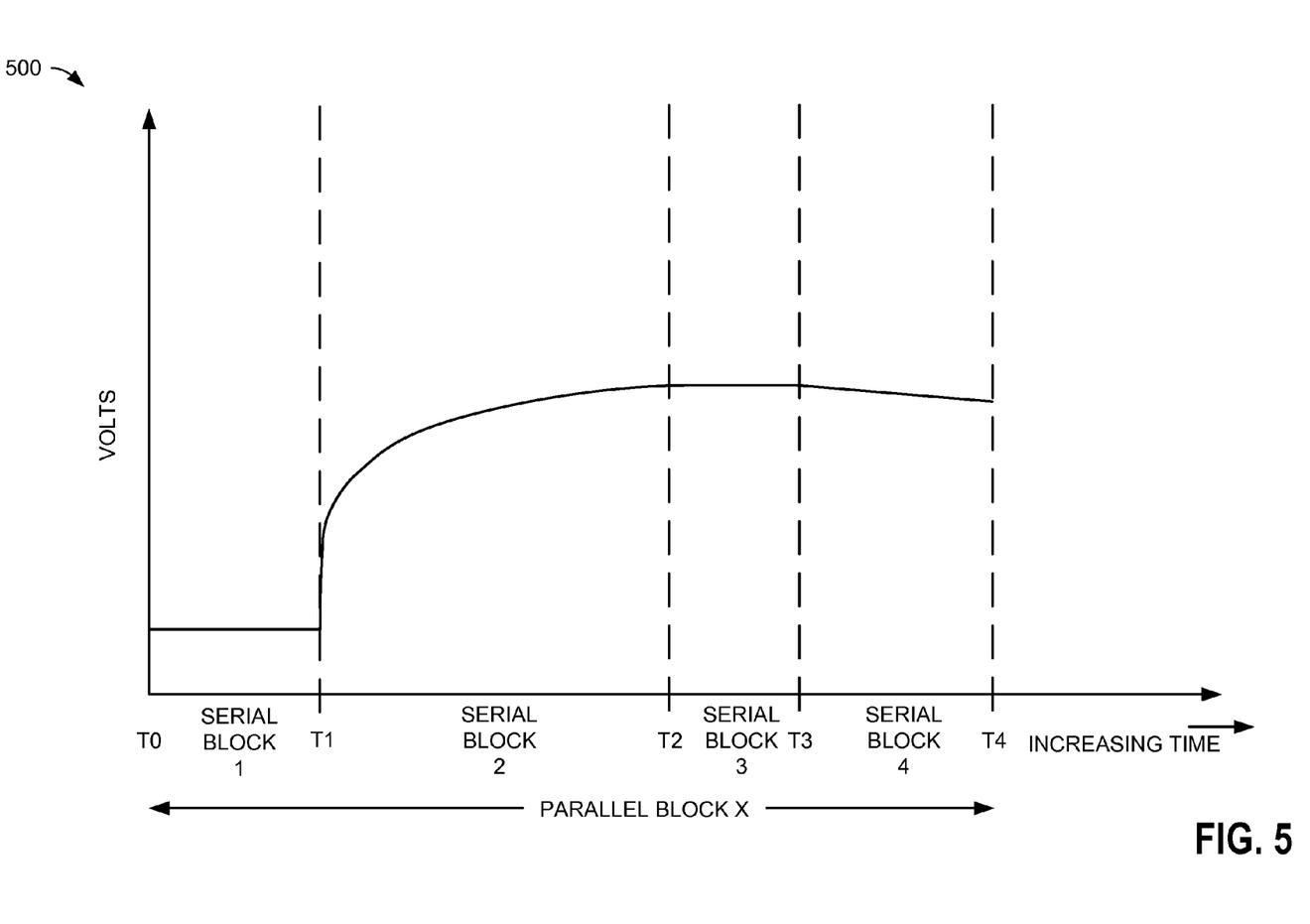
FIGS. 5 and 6 show example battery charging sequences for two different battery profiles.
Figure 6:
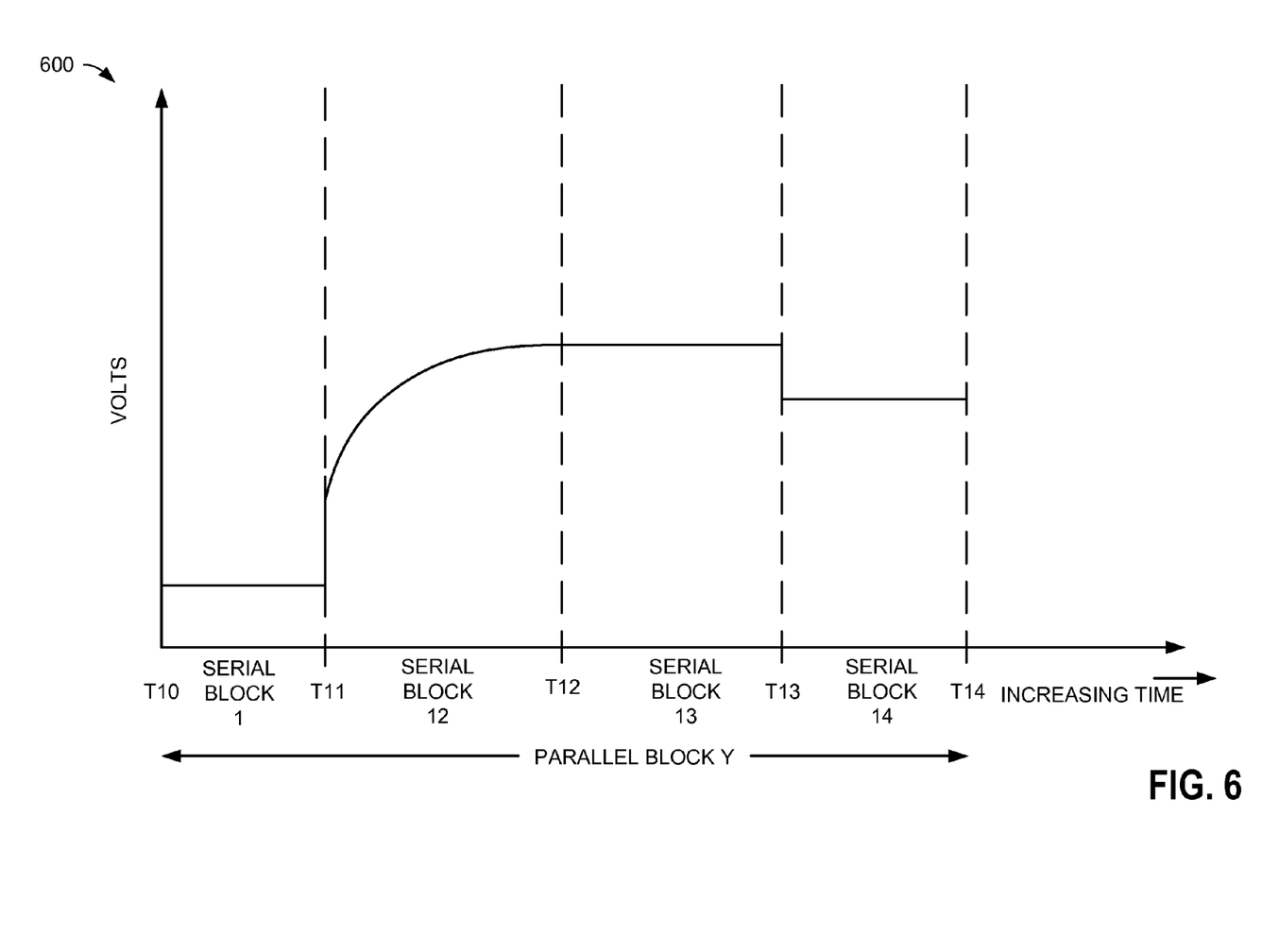
Figure 7:
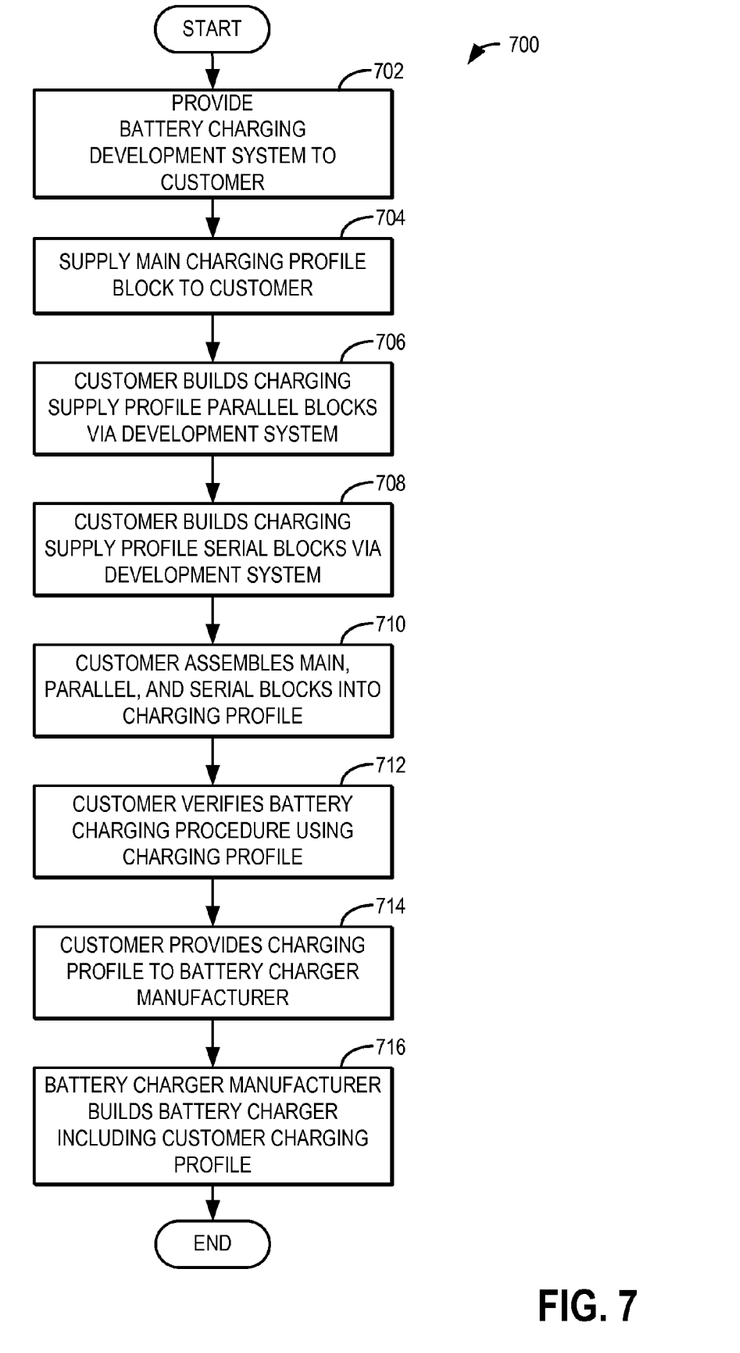
FIG. 7 shows a flow chart for a method for assembling and applying a battery charging profile.

The following disclosure relates to methods and systems for a battery charger controller. The battery charger controller may be implemented as a single integrated circuit (IC). The battery charger controller may charge a plurality of different battery types. A battery charging profile included with the battery charger controller may be constructed via and evaluated via the system shown in FIG. 1. The battery charging profile may subsequently be incorporated into a high volume battery charger capable of charging a plurality of battery types as is shown in FIG. 2. The battery charging profile may be comprised of a main block, one or more parallel blocks, and one or more serial blocks as shown in FIG. 3. The different blocks may be assembled in the battery charging profile file as shown in the block diagram of FIG. 4. FIGS. 5 and 6 show example battery charging procedures that are based on example battery charging profiles. FIG. 7 is a flowchart of a method for building a battery charging profile and incorporating the battery charging profile into a high volume battery charger.

Figure 1:
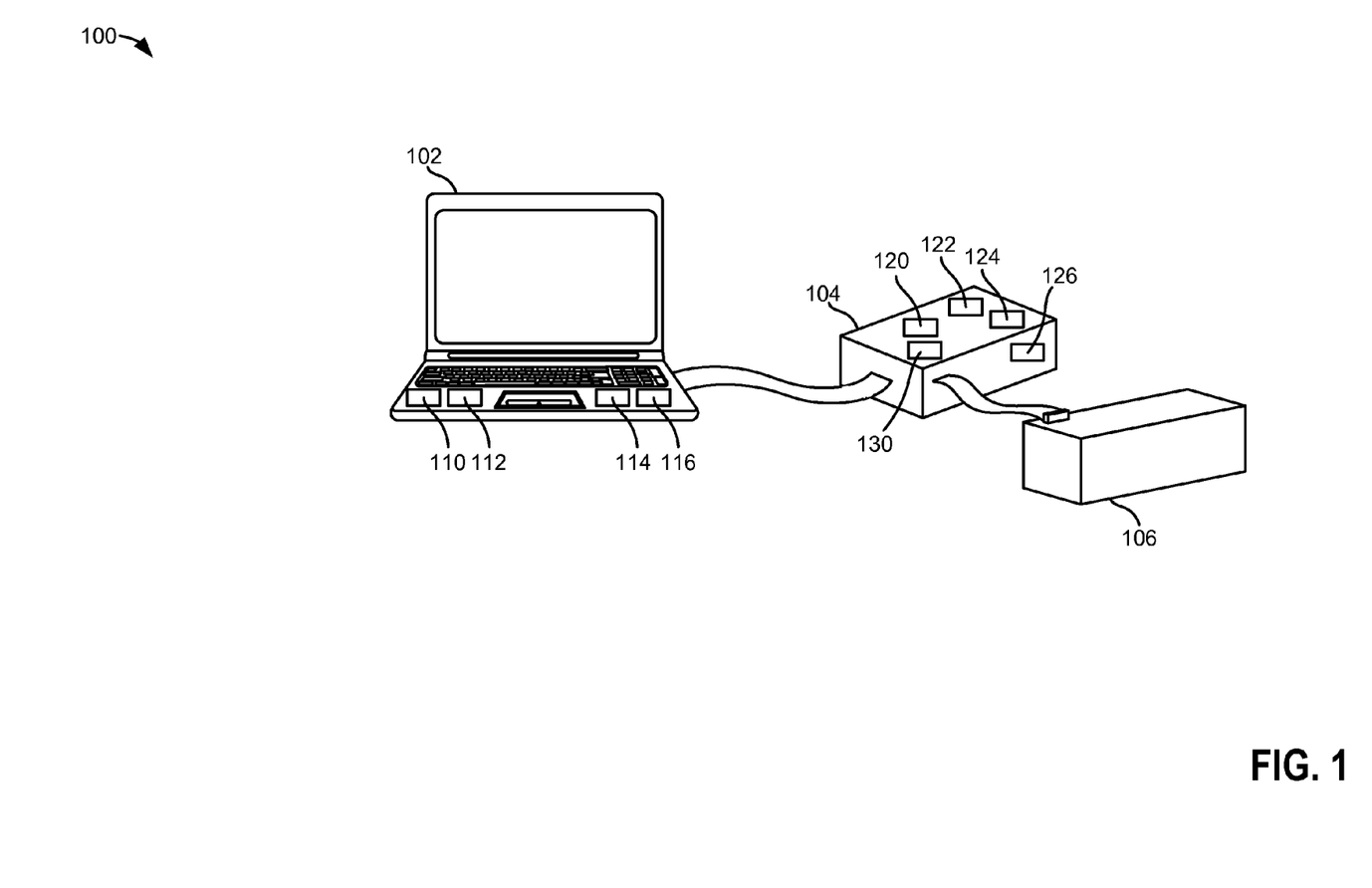
FIG. 1 shows an example battery charging development system.

FIG. 1 depicts an example algorithmic battery charging development system. The algorithmic battery charging development system shown in FIG. 1 builds a battery charging profile as described in FIGS. 3-4 and 7 in response to user or customer input. The battery charging development system may also charge a battery according to the battery charging profile.

Battery development system 100 includes an input device 102 for receiving customer or user battery input data. In one example, input device 102 is a personal computer. In other examples, input device 102 may be a note pad device or another type of user interface. Input device 102 is in electrical communication with battery charging device 104. Battery charging device 104 includes circuitry for charging battery 106 with a constant voltage or constant current. In one example, battery 106 is a single cell battery. In other examples, battery 106 is a battery pack comprised of a plurality of battery cells including batteries arranged in serial and parallel configurations.

Input device 102 includes a user interface for inputting specific battery information for the battery profile being built and the battery to be charged. The user interface may include software that includes instructions to store data in files that are based on parallel and serial blocks populated with data input by a customer or user. The parallel and serial blocks are as described in FIGS. 3 and 4. In one example, a battery charging profile file is assembled by input device 102, stored in memory of input device 102, and transferred to battery charging device 104 where the battery charging file is read. Battery 106 is charged based on the battery charging profile by battery charging device 104.

For example, input device 102 may include a central processing unit or controller 110, non-transitory memory 112 for storing executable instructions for assembling a battery charging profile, transient memory 114, and inputs and outputs 116 for communicating with battery charging device 104. Devices 110-116 may be part of a single IC. Battery charging device 104 includes power block 130 to charge battery 106 and central processing unit or controller 120 for storing and executing non-transitory instructions stored in memory. Controller 120 includes non-transitory instructions to read a battery charging profile that is comprised of a main block, at least one parallel block, and at least one serial block. Power block 130 is a generic power block that includes interface circuitry between battery 106 and controller 120. Since power block 130 is generic, it may supply a wider range of voltages and/or currents so that a wide range of batteries may be charged during device development. Power block 130 responds to outputs from controller 120, thereby supplying current and/or voltage to battery 106. In some examples, power block 130 may also include input interface circuitry so that controller 120 may monitor and/or identify battery 106. Controller 120 may also receive a copy of a battery charging profile from input device 102. The battery charging profile may be transferred from the input device 102 to the battery charging device. Central processing unit or controller 120 may include non-transitory memory 122 for storing executable instructions for reading the battery charging profile and charging a battery or battery pack, transient memory 124, and inputs and outputs 126 for controlling and adjusting voltage and current supplied to battery 106 via power block 130. Controller 120 also includes communication ports for communicating with input device 102.

Referring now to FIG. 2, an example high volume battery charging system is shown. High volume charging system 200 includes a battery charger 202 and battery 106. Battery charger 202 includes controller 220 (e.g., same hardware as controller 120) which includes a battery charging profile stored in non-transitory memory 222 along with executable instructions for reading the battery charging profile and charging battery 106 based on the battery charging profile. Battery charger 202 also includes controller inputs and outputs 226 for commanding and controlling power block 230. Power block 230 is optimized for the particular battery charging operation instead of being a generic power block as is described in FIG. 1. Power block 230 is optimized to reduce size and improve charging efficiency for the particular charging application for which it is designed. Power block 230 may be designed to charge a plurality different types of batteries having different chemistries, storage capacities, and output voltages. In some examples, controller 220, transitory memory 224, inputs and outputs 226, and non-transitory memory 222 are contained in a single IC.

In one example, battery charger 202 is built by a battery charger manufacturer other than the battery manufacturer, and it includes a battery charging profile provided by the battery manufacturer. Alternatively, the battery charging profile may be provided by the device manufacturer instead of the battery manufacturer. The battery charging profile is read by the battery charger CPU 220 and battery 106 is charged according to the battery charging profile.

Thus, the battery charging system of FIGS. 1 and 2 includes a battery charging system, comprising: a battery charging development system including a controller, the controller including executable instructions stored in non-transitory memory for a user interface, additional instructions for prompting a user for battery data, and additional instructions for assembling the user battery data into a parallel block and a series block that are used to charge a battery. The battery charging system further comprises additional instructions for assembling the parallel block and the series block into a battery charging profile and storing the battery charging profile to non-transitory memory.

In some examples, the battery charging system further comprises a battery charger including a version of the battery charging profile. The battery charging system includes where the parallel block includes conditions that exist for the serial block. The battery charging system also includes where the condition that exists for the serial block is a condition for operating a LED to notify a user of a battery condition. The battery charging system further comprises a battery charger that receives lithium-ion batteries and NiMH batteries, and where the battery charger includes a version of the parallel block and a version of the series block.

The system of FIGS. 1 and 2 also provides for a battery charging system, comprising: a controller, the controller including executable instructions stored in non-transitory memory for charging a battery in response to data in a main block, a parallel block, and a series block. The battery charging system further comprises a power block, the power block supplying current and/or voltage to a battery, the power block in electrical communication with the controller. The battery charging system further comprises a plurality of additional parallel blocks for a plurality of battery types. The battery charging system includes where the parallel block includes conditions that exist for the serial block. The battery charging system includes where the condition that exists for the serial block is a condition for operating a LED to notify a user of a battery condition. The battery charging system includes where the main block, parallel block, and serial block are part of a battery profile file.

Referring now to FIG. 3, a block diagram showing relationships between battery charger blocks is shown. A battery charging block may be stored as a file to memory. Battery charging profile 300 includes main block 304, parallel blocks 306-310, and serial blocks 320-329. Main block 304, parallel blocks 306-310, and serial blocks 320-329 are comprised of battery charging related variables. The blocks may be stored as a file in a battery charger's memory. In this example, battery charging profile 300 provides battery charging parameters for charging three different battery types, batteries 1-3, and the batteries are charged with different charging stages.

User interface software 302 may be provided to a user or customer (e.g., device manufacturer or battery manufacturer). In one example, user interface software 302 is installed in a personal computer as shown in FIG. 1. In other examples, user interface software 302 may be included in a note pad or other device. The user or customer is prompted to answer battery specific questions so that the battery charging profile 300 may be constructed and stored to memory by the battery development system 100 as is shown in FIG. 1.

In one example, user interface software 302 queries the user for values of variables included in main block 304. In other examples variables in main block 304 are provided by the battery charger manufacturer and do not receive input from the user interface software 302.

Main block 304 includes battery charging information that is applicable to all types of batteries. A single main block is included in battery charging profile 300. In one example, main block 304 includes battery charger light emitting diode (LED) operation and status control variables, battery detection methods, and profile ID detection method. The battery detection methods are used to detect the presence of a battery and the profile contains a variable that indicates which of a plurality of battery detection methods stored in the battery charger is to be used to detect presence of a battery. The status LED settings inform the battery charger how the battery charger should turn or or blink a status LED for different battery charger status conditions. A capacity LED setting informs the battery charger whether or not the battery capacity is to be shown on LEDs. The smart battery slave address is an address used by the battery charger to communicate with the smart battery. The profile ID detection method informs the battery charger which specific battery (e.g., battery 1, 2, or 3 shown in FIG. 3) has been connected to the battery charger so that the battery charger may select a specific profile (e.g., a combination of one parallel block and its associated serial blocks) should be executed to charge the connected battery.

The user interface also queries the user or customer for parallel block input. The parallel blocks contain variables that pertain to a specific battery type (e.g., lithium-ion, lead acid, or nickel metal hydride (NiMH)), and the variables are populated from user input. For example, parallel blocks may include but are not limited to variables for battery chemistry identification, battery specifications, battery degradation settings, and profile ID. The parallel block includes a name which is recorded for information only and it does not affect battery charging. The battery chemistry is a name of a battery chemistry and it is recorded for information only and it does not affect battery charging. The battery specification includes information for a number of battery cells of the battery that are electrically connected in series and a number of battery cells that are electrically connected in parallel. The battery specification information is for reference only and it does not affect battery charging. The profile ID is used for identification purposes and every parallel block has a unique ID. The fault detection settings include information regarding the type of battery parameters and their minimum and maximum values. The battery charger is limited to the minimum and maximum values during battery charging. If one or more parameters are exceeded, the battery charger will stop battery charging and indicate a degraded condition via a status LED.

The user interface also queries the user or customer for serial block input. The serial blocks contain variables for operating the battery charger during different battery charging stages. One or more serial blocks may be combined to provide a multiple stage battery charging cycle. Each serial block provides a battery charging stage. Additionally, the serial blocks may be interchanged for use between different battery types and with different parallel blocks. In one example, the serial blocks include starting and ending battery charging conditions, charging methods (e.g., no operation, constant current charging, and constant voltage charging), serial block name, serial block ID, and previous block ID. Constant current charging mode allows user specified maximum battery charging voltage and a constant charging current. Constant voltage charging mode allows user specified maximum charging current and a constant charging voltage. The serial block ID is used to identify a serial block and each serial block includes a unique ID. The previous block ID identifies a serial block that is organized before a particular serial block. For example, each serial block includes one or more preceding serial blocks, except for a starting or first serial block in a group of serial blocks. Based on a starting charge condition, the battery charger executes a preceding serial block before executing the particular serial block (e.g., the second serial block). The previous block IDs allow the battery charger to link all serial blocks for charging a battery into a meaningful charging flow.

In this example, parallel block 306 corresponds to battery number three, and it includes battery charging stages that are based on serial blocks 320-327. In this particular example, battery number three is charged in eight stages based on serial blocks 320-327. The battery stages are performed from left to right (e.g., 320-327).

Parallel block 308 corresponds to battery number two, and it includes battery charging stages that are based on serial blocks 320-322, 324, 325, 328, and 329. The battery stages are performed from left to right and some serial blocks are used more than once. Additionally, the order that the stages are performed is different for battery number two than for battery number three. Finally, battery number two is charged in more stages than battery number three.

Parallel block 310 corresponds to battery number one, and it includes battery charging stages that are based on serial blocks 320-322, 324, and 327-328. The battery stages are performed from left to right and the order that the stages are performed is different for battery number one than for battery numbers two and three. Additionally, battery number one is charged in only six stages.

Once the user inputs the information for parallel blocks and serial blocks into the battery development system 100 via user interface 302, the parallel blocks and serial blocks may be stored in individual files. Alternatively, the parallel blocks and serial blocks may be stored as part of a battery charging profile. The user or customer may then supply battery charging profile file versions to the battery charger manufacturer.

In this way, a single battery charging profile may be the basis for a battery charger that charges a plurality of different battery types in a plurality of different ways. Further, different series blocks may be ordered in different sequences with different parallel blocks to charge different types of batteries. Thus, since battery charging profile 300 allows for reusing serial blocks, the user or customer may be able to provide a large number of different battery charging sequences from a small number of charging stages.

Figure 4:
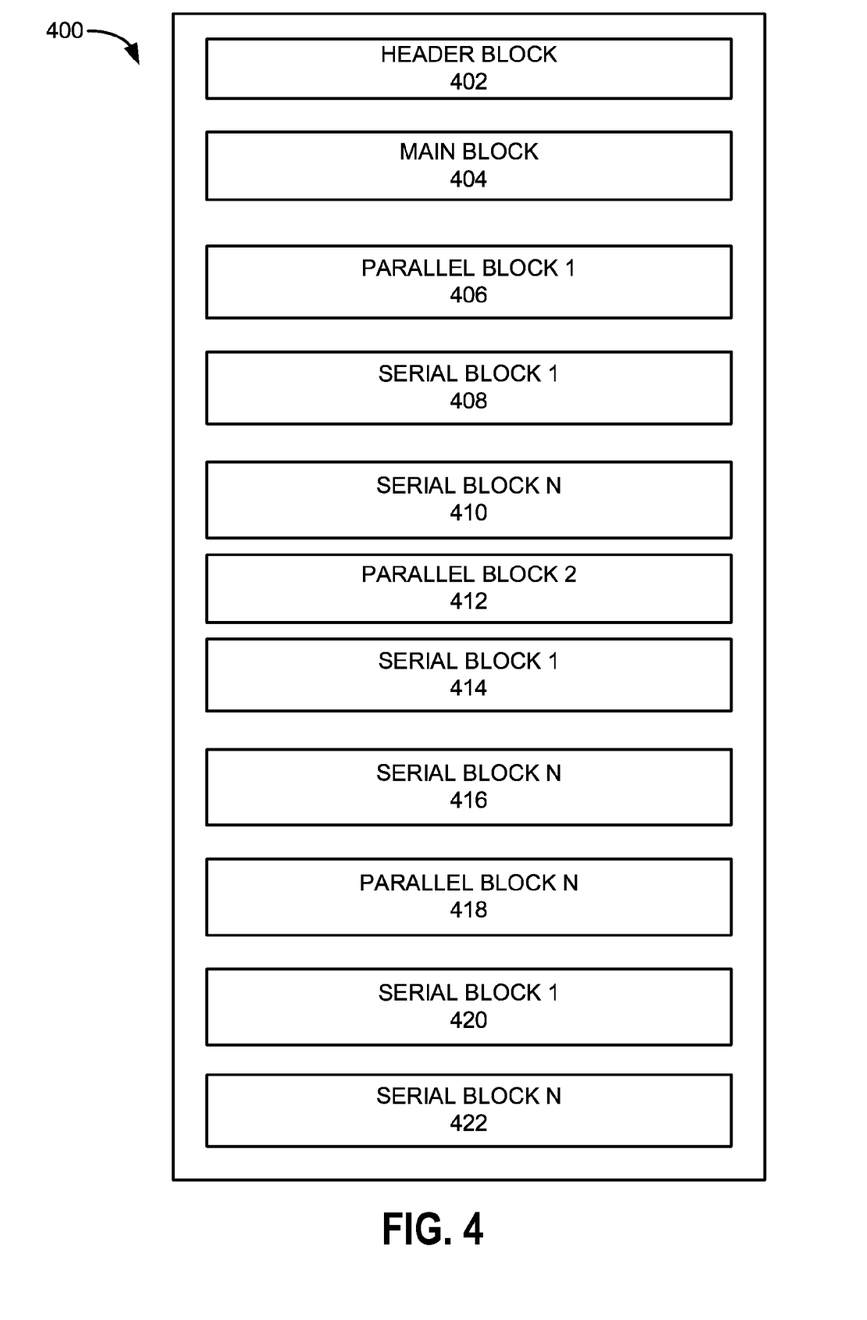
FIG. 4 shows a block diagram of an example battery charging profile file.

Referring now to FIG. 4, a block diagram of an example battery charging profile file is shown. Battery charging profile 400 includes a sole header block 402; a sole main block 404; parallel blocks 406, 412, 418; and serial blocks 408, 410, 414, 416, 420, 422 for charging a plurality of battery types according to a plurality of charging stages as defined by the serial blocks. The header block includes data regarding the battery profile structure version and the profile size. The main block, parallel blocks, and serial blocks include the information described in FIG. 3.

In this example, battery charging profile 400 includes from 1 to N parallel blocks to provide battery type specific information for N battery types. The customer or user may define a plurality of battery types so that a single battery charger may recharge the plurality of battery types instead of being limited to a single battery type or design. The battery charging profile also includes from 1 to N serial blocks. The same serial blocks may be used with different parallel blocks to define charging stages for a plurality of different battery types, and each different battery type may include a unique combination of charging stages.

Table 1 shows one example of content within a battery profile file. The battery profile includes one header block, one main block, one or more parallel blocks, one or more serial blocks, and one end block. In table 1, one header block, one main block, one parallel block, one serial block, and one end block are shown.

The top row of table 1 is shown in bold outline and it provides example hex addresses for variables in table 1. For example, the first variable is stored at hex address 0x00 and it is the profile structure version. The second variable is stored at hex address 0x01 and it is the profile size. In this example, the charging profile header data is located at hex addresses 0x00-0x03, the charging profile header block is located at hex addresses 0x04-0x20, parallel blocks are stored at hex addresses 0x21-0x5A, and serial blocks are stored at hex addresses 0x5B-0xAF. The end block is at hex address 0xB0 to 0xB1. The first column of table 1 is the hex starting address for the variables in columns two through five in the row of the hex address.

TABLE 1

| Hex address | Hex address | Hex address + 1 | Hex address + 2 | Hex address + 3 |
|---|---|---|---|---|
| 0x00 | Profile structure version | Profile size | Profile size | Number of parallel blocks |
| 0x04 | Smart battery slave address | Get profile command | Profile ID detection method (b0-b1) 1$^{st}$ battery detection method (b2-b4) | 2$^{nd}$ battery detection method (b0-b2) 2$^{nd}$ battery detection relationship (b3) 3$^{rd}$ battery detection method (b4-b6) Enable capacity LED (b7) |
| 0x08 | Searching next block LED color (b0-b2) + Searching next block LED display mode (b3) + Charging done LED color (b4-b6) + Charging done LED display mode (b7) | Profile error LED color (b0-b2) + Profile Error LED display mode (b3) + SD card error LED color (b4-b6) + SD card error display mode (b7) | Over rating LED color (b0-b2) + Over rating LED display mode (b3) + Start up fault LED color (b4-b6) + Start up fault LED display mode (b7) | Searching next block LED ON time (b0-b6) |
| 0x0C | Searching next block LED off time (b0-b6) | Charging done LED on time (b0-b6) | Charging done LED off time (b0-b6) | Profile error LED on time (b0-b6) |
| 0x10 | Profile error LED off time (b0-b6) | SD card error LED on time (b0-b6) | SD card error LED off time (b0-b6) | Over rating LED on time (b0-b6) |
| 0x14 | Over rating LED off time (b0-b6) | Start up fault LED on time(b0-b6) | Start up fault LED off time(b0-b6) | SMBus error LED on time (b0-b6) |
| 0x18 | SMBus error LED off time (b0-b6) | Battery revert LED on time (b0-b6) | Battery revert LED off time (b0-b6) | High battery voltage LED on time (b0-b6) |
| 0x1C | High battery voltage LED off time (b0-b6) | SMBus error LED color (b0-b2) + SMBus error LED display mode (b3) + Battery revert LED color (b4-b6) + Battery revert + LED display mode (b7) | High battery voltage LED color (b0-b2) + High battery voltage LED display mode (b3) + Low input voltage LED color (b4-b6) + Low input voltage LED display mode (b7) | Low input voltage LED on time (b0-b6) |
| 0x20 | Low input voltage LED off time (b0-b6) | Profile detection ID | Parallel block name [0] | Parallel block name [1] |
| 0x24 | Parallel block name [2] | Parallel block name [3] | Parallel block name [4] | Parallel block name [5] |
| 0x28 | Parallel block name [6] | Parallel block name [7] | Parallel block name [8] | Parallel block name [9] |
| 0x2C | Parallel block name [10] | Parallel block name [11] | Parallel block name [12] | Parallel block name [13] |
| 0x30 | Parallel block name [14] | Parallel block name [15] | Parallel block name [16] | Parallel block name [17] |
| 0x34 | Parallel block name [18] | Parallel block name [19] | Battery chemistry [0] | Battery chemistry [1] |
| 0x38 | Battery chemistry [2] | Battery chemistry [3] | Battery chemistry [4] | Battery chemistry [5] |
| 0x3C | Battery chemistry [6] | Battery chemistry [7] | Battery chemistry [8] | Battery chemistry [9] |

TABLE 1-continued

| Hex address | Hex address | Hex address + 1 | Hex address + 2 | Hex address + 3 |
| --- | --- | --- | --- | --- |
| 0x40 | Battery cell number in serial | Battery cell number in parallel | Max charge voltage per cell (LSB) | Max charge voltage per cell (MSB) |
| 0x44 | Max charge current per cell (LSB) | Max charge current per cell (MSB) | Capacity per cell (LSB) | Capacity per cell (MSB) |
| 0x48 | Voltage more than value (LSB) | Voltage more than value (MSB) | Voltage less than value (LSB) | Voltage less than value (MSB) |
| 0x4C | Current more than value (LSB) | Current more than value (MSB) | Current less than value (LSB) | Current more than value (MSB) |
| 0x50 | Temperature more than value (LSB) | Temperature more than value (MSB) | Temperature less than value (LSB) | Temperature more than value (MSB) |
| 0x54 | Voltage more than enable (b0) + Voltage less than enable (b1) + Current more than enable (b2) + Current less than enable (b3) + Temperature more than enable (b4) + Temperature less than enable (b5) | Number of serial block (b0-b4) + $1^{st}$ fault check method (b5-b7) | $1^{st}$ fault check relationship (b0) $2^{nd}$ fault check method (b1-b3) $2^{nd}$ fault check relationship (b4) $3^{rd}$ fault check method (b5-b7) | $3^{rd}$ fault check relationship (b0) $4^{th}$ fault check method (b1-b3) $4^{th}$ fault check relationship (b4) $5^{th}$ fault check method (b5-b7) |
| 0x58 | Time value (LSB) | Time value (LSB + 1) | Time value (MSB) (b0-b2) Activate SMBus capacity reading (b3) Voltage sensor (b4) Current sensor (b5) Temperature sensor (b6) | Serial Block ID |
| 0x5C | Possible previous block ID 1 | Possible previous block ID 2 | Possible previous block ID 3 | Possible previous block ID 4 |
| 0x60 | Possible previous block ID 5 | Serial block name [0] | Serial block name [1] | Serial block name [2] |
| 0x64 | Serial block name [3] | Serial block name [4] | Serial block name [5] | Serial block name [6] |
| 0x68 | Serial block name [7] | Serial block name [8] | Serial block name [9] | Serial block name [10] |
| 0x6C | Serial block name [11] | Serial block name [12] | Serial block name [13] | Serial block name [14] |
| 0x70 | Serial block name [15] | Serial block name [16] | Serial block name [17] | Serial block name [18] |
| 0x74 | Serial block name [19] | Charging voltage (LSB) | Charging voltage (MSB) | Charging current value (LSB) |
| 0x78 | Charging current value (MSB) | Start condition voltage less than value (LSB) | Start condition voltage less than value (MSB) | Start condition voltage more than value (LSB) |
| 0x7C | Start condition voltage more than value (MSB) | Start condition capacity less than value (LSB) | Start condition capacity less than value (MSB) | Start condition capacity more than value (LSB) |
| 0x80 | Start condition capacity more than value (MSB) | End condition voltage charge period (LSB) | End condition voltage charge period (MSB) | End condition voltage stop charge period (LSB) |
| 0x84 | End condition voltage stop charge period (MSB) | End condition voltage max (LSB) | End condition voltage max (MSB) | End condition voltage min (LSB) |
| 0x88 | End condition voltage min (MSB) | End condition dV value (LSB) | End condition dV value (MSB) | End condition current max (LSB) |
| 0x8C | End condition current max (MSB) | End condition current min (LSB) | End condition current min (MSB) | End condition dT value |
| 0x90 | End condition capacity max (LSB) | End condition capacity max (MSB) | End condition capacity min (LSB) | End condition capacity min (MSB) |
| 0x94 | End condition time value (LSB) | End condition time value (LSB + 1) | End condition time value (LSB + 2) | End condition time value (MSB) |
| 0x98 | Pulse on time (LSB) | Pulse on time (MSB) (b0-b5) + charging mode (b6-b7) | Pulse off time (LSB) | Pulse off time (MSB) (b0-b5) + use pulse (b6) |

TABLE 1-continued

| Hex address | Hex address | Hex address + 1 | Hex address + 2 | Hex address + 3 |
|---|---|---|---|---|
| 0x9C | $1^{st}$ start condition (b0-b2) + $1^{st}$ start condition relationship (b3) + $2^{nd}$ start condition (b4-b6) + $2^{nd}$ start condition relationship (b7) | $3^{rd}$ start condition (b0-b2) | Start condition temperature less than value (LSB) | Start condition temperature less than value (MSB)(b0) + start condition voltage enable less than (b1) + start condition voltage enable more than (b2) + start condition temperature enable less than (b3) + start condition temperature enable more than (b4) |
| 0xA0 | Start condition temperature more than value (LSB) | Start condition temperature more than value (MSB) (b0) + start condition capacity enable less than (b1) + start condition capacity enable more than (b2) | $1^{st}$ end condition (b0-b2) + $1^{st}$ end condition relationship (b3) + $2^{nd}$ end condition (b4-b6) + $2^{nd}$ end condition relationship (b7) | $3^{rd}$ end condition (b0-b2) + $3^{rd}$ end condition relationship (b3) + $4^{th}$ end condition (b4-b6) + $4^{th}$ end condition relationship (b7) |
| 0xA4 | $5^{th}$ end condition (b0-b2) | End condition dV/dt dt value (LSB) | End condition dV/dt dt value (MSB) (b0-b6) | End condition dT/dt dt value (LSB) |
| 0xA8 | End condition dT/dt dt value (MSB) (b0-b6) | End condition temperature max (LSB) | End condition temperature max (MSB) (b0) + end condition stop charge before sense voltage (b1) + end condition voltage max enable (b2) + end condition voltage min enable (b3) + end condition voltage + dV/dt enable (b4) + end condition voltage − dV/dt enable (b5) | End condition temperature min (LSB) |
| 0xAC | End condition Temperature Min (MSB) (b0) + end condition temperature + dT/dt enable (b1) + end condition temperature − dT/dt enable (b2) + end condition temperature max enable (b3) + end condition temperature min enable (b4) | End condition current max enable (b0) + end condition current min enable (b1) + end condition capacity max enable (b2) + end condition capacity min enable (b3) + LED color (b4-b6) + LED display method (b7) | LED on time | LED off time |
| 0xB0 | End block data 1 | End block data 2 | | |

The battery changing profile as shown includes a profile structure version that is used to keep track of different profile structure versions so that the profiles are decoded properly. The profile size depends on a total number of batteries and it affects the total number of parallel blocks and serial blocks. The profile also includes the profile ID, battery detection method, status LED setting, battery chemistry, parallel block name, fault detection/check settings, serial block ID, previous block ID, serial block name, and capacity LED setting as previously described. The profile also includes a get profile command. The get profile command is sent by one profile detection method to the smart battery for retrieving the profile ID. The get profile command field provides the command value to the battery charger. The battery charging profile also includes a charging voltage which is the voltage value applied to the battery when charging the battery according to the serial block. The battery charging profile also includes a charging current which is the current applied to the battery when charging the battery according to the serial block. The battery charging profile includes a pulse on time for when the battery charger is turned on and off in a continuous repetitive cycle. The pulse on time field specifies the duration the battery charger charges the battery before it stops charging the battery. The start condition field includes parameters and their conditions that must be fulfilled before the battery charger begins executing serial blocks. The end condition field includes parameters and their conditions that must be fulfilled before the battery charger stops executing the present serial block so that the battery charger can proceed to the following serial block.

In this way, a battery charging profile file may be arranged to reduce the number of battery parameters stored and memory used to store the parameters. Further, the serial blocks may be shared between different battery types so that unique serial blocks may not have to be created for each new battery type.

Referring now to FIG. 5, a first example battery charging sequence based on a battery charging profile is shown. The signals shown in FIG. 5 may be provided by the system of FIGS. 1-4 according to the method of FIG. 7.

Plot 500 shows a battery charging sequence for a lithium-ion battery. The plot has a X axis that has units of time. Time increases from the left side of the plot to the right side of the plot. The plot has a Y axis with units of battery volts. Battery voltage increases from the X axis in the direction of the Y axis arrow. Vertical markers T0-T4 represent times where different battery stages occur based on different series blocks.

At time T0, battery charging enters a conditioning stage where battery voltage is at a relatively low level. The battery voltage stays at the low level until time T1 when the second charging stage begins according to serial block number two. Serial block number one is entered when serial block number one entry conditions are met. Serial block number one exits when serial block number one exit conditions are met. Each serial block may have specific entry and exit conditions.

At time T1, the second charging stage begins in response to entry conditions for serial block number two being met. The battery charger supplies a constant current to the lithium-ion battery during the second charging state and the battery voltage responds with a first order voltage response. The second charging state ends at time T2 when exit conditions for the second serial block are met.

At time T2, the third charging state begins in response to entry conditions for serial block number three being met. The battery charger supplies a constant voltage to the lithium-ion battery during the third charging state and battery voltage is relatively constant. The third charging stage ends at time T3 when exit conditions for the third serial block are met.

At time T3, the fourth charging stage begins in response to entry conditions for serial block number four being met. The battery charger enters a standby mode during the fourth stage and the battery voltage is reduced by a small amount. The fourth charging stage ends at time T4 when exit conditions for the fourth serial block are met.

It should be noted that the battery charger applies parameters from parallel block X during the time from T0-T4. Thus, only a single parallel block is used when a particular battery is being charged. In this example, parallel block X corresponds to a parallel block for a lithium-ion battery.

Referring now to FIG. 6, a first example battery charging sequence based on a battery charging profile is shown. The signals shown in FIG. 6 may be provided by the system of FIGS. 1-4 according to the method of FIG. 7.

Plot 600 shows a battery charging sequence for a lead acid battery. The plot has a X axis that has units of time. Time increases from the left side of the plot to the right side of the plot. The plot has a Y axis with units of battery volts. Battery voltage increases from the X axis in the direction of the Y axis arrow. Vertical markers T10-T14 represent times where different battery stages occur based on different series blocks.

At time T0, battery charging enters a conditioning stage where battery voltage is at a relatively low level. The battery voltage stays at the low level until time T11 when the second charging stage begins according to serial block number twelve. Serial block number one is entered when serial block number one entry conditions are met. Serial block one exits when serial block number one exit conditions are met. It should be noted that serial block number one from the example in FIG. 5 is applied to the example in FIG. 6. In this way, serial blocks may be exchanged between charging profiles for different batteries.

At time T11, the second charging stage begins in response to entry conditions for serial block number twelve being met. The battery charger supplies a constant current to the lead acid battery during the second charging state and the battery voltage responds with a first order voltage response. The second charging state ends at time T12 when exit conditions for the twelfth serial block are met.

At time T12, the third charging state begins in response to entry conditions for serial block number thirteen being met. The battery charger supplies a constant voltage to the lead acid battery during the third charging state and battery voltage is relatively constant. The third charging stage ends at time T13 when exit conditions for the thirteenth serial block are met.

At time T13, the fourth charging stage begins in response to entry conditions for serial block number fourteen being met. The battery charger enters a float mode during the fourth stage and the battery voltage is reduced in a step like manner. The fourth charging stage ends at time T14 when exit conditions for the fourteenth serial block are met.

It should be noted that the battery charger applies parameters from parallel block Y during the time from T10-T14. Thus, only a single parallel block is used when a particular battery is being charged. In this example, parallel block Y corresponds to a parallel block for a lead acid battery.

Referring now to FIG. 7, a flowchart for a method for assembling and applying a battery charging profile is shown. The method may be stored in non-transitory memory and it may be implemented as executable instructions in a system as is shown in FIGS. 1-4.

At 702, method 700 includes providing an algorithmic battery charging system to a customer or user by the battery charger manufacturer. In one example, the customer or user may be a battery manufacturer or a device manufacturer (e.g., medical or industrial device manufacturer). The battery manufacturer may apply the algorithmic battery charging system to develop a battery charging sequence for a new battery or a redesigned battery. The algorithmic battery charging system may be a system as is described in FIGS. 1-4. Method 700 proceeds to 704 after the algorithmic battery charging system is provided to the customer.

At 704, a main block of a battery charging profile is supplied to a battery charger customer. In one example, the main block is a block as is described in FIGS. 3 and 4. In other examples, the main block may be developed by the customer via the user interface described in FIG. 3. The main block may be stored by the battery charger in the algorithmic battery charger's controller memory once it is created. Method 700 proceeds to 706 after the main block is produced.

At 706, the customer builds one or more parallel blocks for integrating into a battery charging profile. In one example, the parallel blocks data are of the form described in FIGS. 3 and 4. The customer builds the parallel blocks by entering battery specific parameters into the algorithmic battery charging system via the user interface. The user input data may be stored in memory (e.g., non-transitory memory 112 of FIG. 1) as separate parallel blocks. Each parallel block may be stored in a separate file that may be retrieved when desired. Method 700 proceeds to 708 after the parallel blocks are built and stored to memory.

At 708, the customer builds one or more serial blocks for integrating into a battery charging profile. In one example, the serial blocks include data and are of the form described in FIGS. 3 and 4. The customer builds the serial blocks by entering specifics for battery charging stages into the algorithmic battery charging system via the user interface. The user input data may be stored in memory (e.g., non-transitory memory 112 of FIG. 1) as separate series blocks. Each series block may be stored in a separate file that may be retrieved when desired. The serial blocks may do nothing, charge the battery based on constant current charging, or charge the battery based on constant voltage charging. Method 700 proceeds to 708 after the parallel blocks are built.

At 710, the customer assembles the main, parallel, and serial blocks into a battery charging profile via the algorithmic battery charging system. In one example, the customer selects the main block, parallel blocks, and series blocks from a list of files stored in memory and that were previously developed via user input. The charging profile is built from the main block, the parallel blocks, and the series blocks in a format and with data as is described in FIGS. 3 and 4. The battery charging profile may include a variety of parallel blocks (e.g., more than one) to support charging of different types of batteries via a sole battery charging profile. Additionally, the different types of batteries may be charged according to different charging stages that are defined by different series blocks. Thus, the algorithmic battery charging system may be user or customer configured to provide a plurality of battery charging sequences for a plurality of battery types in a single battery charging profile. Method 700 proceeds to 712 after the battery charging profile is created and stored to memory.

At 712, the customer or user charges a battery based on the battery charger profile. The customer couples a battery to the algorithmic battery charging system and the algorithmic battery charging system begins to charge the battery according to the battery charging profile. The customer may monitor battery charging and battery performance while the battery is being charged. Further, the customer verifies that they have assembled the desired main, parallel, and series blocks into the battery charging profile and that the battery is charging according to the battery charging profile. The customer may monitor battery charging via current and voltage sensors. If the customer has not assembled parallel and series blocks in a desired configuration, the customer may reassemble the battery charging profile. Method 700 proceeds to 714 after the customer verifies the battery charging profile.

At 714, the customer provides the battery charging profile to the battery charger manufacturer. The battery charging profile may be supplied to the battery charger manufacturer in the form of a data file stored in memory. The customer may supply the battery charging profile via a memory disc, the internet, or other means. Method 700 proceeds to 716 after the battery charging profile is provided to the battery charger manufacturer.

At 716, the battery charger manufacturer builds a battery charger (e.g., FIG. 2) that includes the battery charging profile (e.g., FIG. 4 and table 1) that was supplied by the customer. The battery charging profile may be stored in battery charger memory (e.g., non-transitory memory 222 of FIG. 2). The battery charger controller (e.g., controller 220 in FIG. 2) reads the battery charging profile and charges batteries that are electrically coupled to the battery charger based on the customer supplied battery charging profile as described in FIGS. 5 and 6, for example. Method 700 proceeds to exit after the battery chargers are manufactured.

In this way, a battery manufacturer may develop a single battery charging profile for a wide range of specific battery chemistries and battery configurations that the battery manufacturer produces. This allows the battery manufacturer to develop a wide range of batteries that may be charged via a single battery charger.

Thus, the method of FIG. 7 provides for a method for manufacturing a battery charger, comprising: assembling a battery charging profile that includes a main block, a parallel block, and a series block; and integrating the battery charging profile into a battery charger. The method includes where the main block includes a plurality of battery charger parameters for a plurality of battery types. The method includes where the battery charger parameters provide information for operating light emitting diode status indicators for a battery charger that charges the battery according to the battery charging profile. The method also includes where the parallel block includes a plurality of battery charger parameters for a specific battery chemistry.

In some examples, the method includes where the specific battery chemistry is at least one of a lithium-ion battery, a lead acid battery, and a nickel metal hydride battery. The method includes where the series block includes battery charger parameters for charging a plurality of batteries including a plurality of battery chemistries. The method includes where the series block further comprises entry and exit conditions for performing and exiting the series block. The method further comprises charging a battery according to the battery charging profile.

In another example, the method of FIG. 7 provides for a method for manufacturing a battery charger, comprising: providing a battery charging development system to a customer; assembling a battery charging profile that includes a main block, a parallel block, and a series block from data input to the battery charging development system via a customer; and manufacturing a battery charging system that includes a version of the battery charging profile.

In one example, the method further comprises charging a battery according to the battery charging profile. The method includes where the main block is provided by a battery charger manufacturer and where the battery charging profile is assembled by the customer. The method further comprises where the battery charging profile is stored to non-transitory memory and where the parallel block is one of a plurality of parallel blocks including a parallel block for charging lithium-ion batteries and a parallel block for charging NiMH batteries. The method also includes where the series block is one of a plurality of series blocks included in the battery charging profile including a series block for providing constant current while charging a battery and a series block for providing constant voltage while charging the battery.

The method also includes were the series block is one of a plurality of series blocks ordered to provide a plurality of battery charging stages during charging of a battery.

Additionally, the method of FIG. 7 provides for method for manufacturing a battery charger, comprising: assembling a battery charging profile that includes a main block, a parallel block, and a series block; and manufacturing a battery charger that includes the battery charging profile. The method includes where the main block includes a plurality of battery charger parameters for a plurality of battery types, and where the battery charging profile is stored in a file. The method also includes where the plurality of battery charger parameters provide information for operating light emitting diode status indicators for the battery charger that charges a battery according to the battery charging profile.

It will be appreciated that the configurations and routines disclosed herein are exemplary in nature, and that these specific examples are not to be considered in a limiting sense, because numerous variations are possible. For example, the above technology can be applied to batteries and battery packs having a wide range of output characteristics, packaging dimensions, and end uses. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for manufacturing a battery charger, comprising:
assembling a battery charging profile that includes a main block of data in memory, a parallel block of data in memory, and a series block of data in memory, where the main block of data in memory includes a plurality of battery charger parameters for a plurality of battery types, and where the battery charging profile is stored in a file that includes the main block of data in memory, an actual total number of parallel blocks of data in memory corresponding to an actual total number of battery types chargeable via the battery charger including the parallel block of data in memory, and an actual total number of series blocks of data in memory corresponding to an actual total number of battery charging stages including the series block of data in memory; and
manufacturing a battery charger that includes the battery charging profile.

2. The method of claim 1, where the plurality of battery charger parameters provides information for operating light emitting diode status indicators for the battery charger that charges a battery according to the battery charging profile, and where the file is arranged in an order where the main block of data in memory is followed in the file by one or more parallel blocks of data in memory, and each parallel block of data in memory of the one or more parallel blocks of data in memory is followed in the file by one or more series blocks.

3. The method of claim 1, where the parallel block of data in memory includes a plurality of battery charger parameters for a specific battery chemistry, and where each series block of data in memory in the file corresponds to a battery charging stage.

4. The method of claim 3, where the specific battery chemistry is at least one of a lithium-ion battery, a lead acid battery, and a nickel metal hydride battery.

5. The method of claim 4, where the series block of data in memory includes battery charger parameters for charging a plurality of batteries including a plurality of battery chemistries.

6. The method of claim 5, where the series block of data in memory further comprises entry and exit conditions for performing and exiting the series block of data in memory, and where the series block of data in memory is used with different parallel blocks of data in memory to charge the plurality of battery types.

7. The method of claim 1, further comprising charging a battery according to the battery charging profile.

8. A method for manufacturing a battery charger, comprising:
providing a battery charging development system to a customer;
assembling a battery charging profile in a file that includes a main block of data in memory, a parallel block of data in memory, and a series block of data in memory from data input to the battery charging development system via the customer, where the parallel block of data in memory is included in an actual total number of parallel blocks of data in memory equivalent to an actual total number of battery types chargeable via the battery charging profile, where the series block of data in memory provides a battery charging stage, and further comprising charging a battery according to the battery charging profile; and
manufacturing a battery charging system that includes a version of the battery charging profile.

9. The method of claim 8, where the main block of data in memory is provided by a battery charger manufacturer and where the battery charging profile is assembled by the customer, and where the file is arranged in an order where the main block of data in memory is followed in the file by the parallel block of data in memory, and the parallel block of data in memory is followed in the file by more than one series block of data in memory.

10. The method of claim 8, where the battery charging profile is stored to non-transitory memory and where the parallel block of data in memory is one of a plurality of parallel blocks of data in memory including a parallel block of data in memory for charging lithium-ion batteries and a parallel block of data in memory for charging NiMH batteries.

11. The method of claim 8, where the series block of data in memory is one of a plurality of series blocks of data in memory included in the battery charging profile including a series block of data in memory for providing constant current while charging a battery and a series block of data in memory for providing constant voltage while charging the battery.

12. The method of claim 8, where the series block of data in memory is one of a plurality of series blocks of data in memory ordered to provide a plurality of battery charging stages during charging of a battery.

13. A method for manufacturing a battery charger, comprising:
providing a battery charging development system to a customer;
assembling a battery charging profile in a file that includes a main block of data in memory, a parallel block of data in memory, and a series block of data in memory from data input to the battery charging development system via the customer, where the parallel block of data in memory includes conditions that exist for the series block of data in memory, and where the battery charging profile is stored in the file that includes the main block of data in memory, an actual total number of parallel blocks of data in memory corresponding to an actual total number of battery types chargeable via the battery charger including the parallel block of data in memory, and an actual total number of series blocks of data in memory corresponding to an actual total number of battery charging stages including the series block of data in memory; and
manufacturing a battery charger that includes a version of the battery charging profile included in a controller.

14. The method of claim 13, further comprising manufacturing the battery charger with a power block in electrical communication with the controller, the power block supplying current and/or voltage to a battery, the power block in electrical communication with the controller.

15. The method of claim 13, where the battery charger further comprises manufacturing the battery charger with a plurality of additional parallel blocks of data in memory in the file corresponding to a plurality of different battery types, and where the series block of data in memory is included in a group of two or more series blocks of data in memory used with a plurality of different parallel blocks of data in memory.

16. The method of claim 13, where the condition that exists for the series block of data in memory is a condition for operating a light emitting diode to notify a user of a battery condition.

* * * * *